Nov. 23, 1954
P. N. MARTIN
2,695,399
MEANS FOR DETECTING ENERGY OF PREDETERMINED
FREQUENCIES IN ELECTRICAL SYSTEMS
Filed March 14, 1952
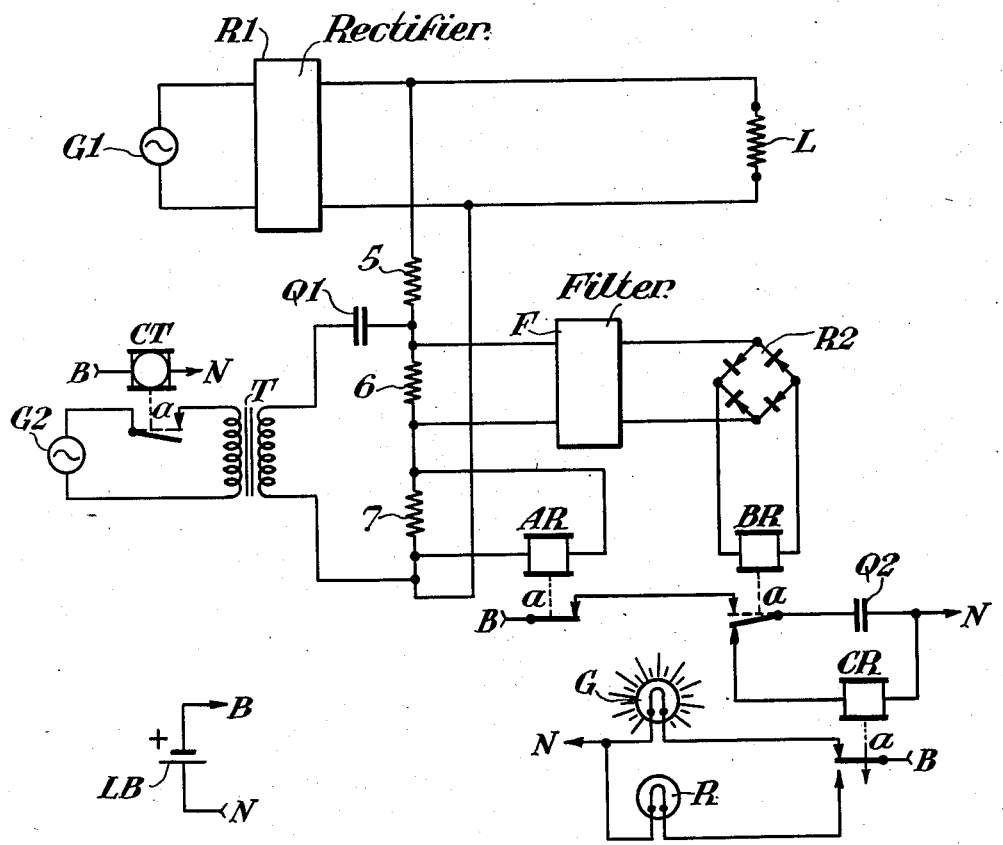
INVENTOR.
Paul N. Martin.
BY
W. L. Stout.
HIS ATTORNEY

United States Patent Office 2,695,399
Patented Nov. 23, 1954

2,695,399

MEANS FOR DETECTING ENERGY OF PREDETERMINED FREQUENCIES IN ELECTRICAL SYSTEMS

Paul N. Martin, Penn Township, Allegheny County, Pa., assignor to Westinghouse Air Brake Company, Wilmerding, Pa., a corporation of Pennsylvania Application March 14, 1952, Serial No. 276,721

5 Claims. (Cl. 340—213)

My invention relates to means for detecting energy of predetermined frequencies in electrical systems, and particularly for detecting the presence of energy at frequencies other than those normally present by the system.

In certain types of electrical systems, it is often necessary to check the operation of the system to insure that energy of a specified frequency only is being supplied to the system, since the presence of energy at one or more other frequencies may cause improper operation of the apparatus associated with the system. For example, in an electrical system in which direct current energy is supplied to a load from a rectifier energized by alternating current, it is sometimes necessary to check that the energy supplied to the load does not contain undesired alternating current components which may be superimposed upon the direct current by improper operation of the rectifier. A specific example of such a requirement is found in the supply of direct current propulsion energy to electric railways, where the direct current energy is obtained from alternating current energy by means of suitable rectifiers. Should a defect develop in the rectifier or the circuits associated therewith, it is possible for frequencies such as the fundamental frequency of the alternating current supply energy or harmonic frequencies thereof to become present in the direct current system. In the event that these frequencies are the same as those employed in the railway signaling system, a situation may arise where the railway signaling apparatus may be improperly energized by ripple frequency energy supplied from the rectifier to the propulsion system.

Accordingly, it is an object of my invention to provide means for detecting the presence of energy of predetermined frequency or frequencies in electrical systems, by providing suitable means responsive only to the presence of the energy of the frequency or frequencies which it is desired to detect.

Another object of my invention is to provide means for detecting the presence of energy of predetermined frequency or frequencies in electrical systems, wherein the system is continuously checked for proper operation.

Another object of my invention is to provide means for detecting the presence of energy of predetermined frequency or frequencies in electrical systems in which the continuity of the connections of the detecting apparatus is continuously checked.

Another object of my invention is to provide means for detecting the presence of energy of predetermined frequency or frequencies in electrical systems in which the operation of the detecting means is constantly checked by the recurrent supply to the system of energy having a frequency which it is desired to detect, and thereafter detecting the recurrent response of the apparatus to this frequency.

A further object of my invention is to provide an improved means for detecting the presence of alternating current energy in the output of a rectifier, which arrangement may be provided to detect the presence of the fundamental frequency of the alternating current energy supplied to the rectifier or harmonic frequencies of the supply frequency.

Other objects of my invention and features of novelty thereof will become apparent from the following description taken in connection with the accompanying drawing.

I shall describe one form of apparatus for detecting the presence of energy of predetermined frequency in electrical systems which embodies my invention, and shall then point out the novel features thereof in claims.

In practicing my invention, I provide a relay of the code-following type which is arranged to be energized from the electrical system through a suitable filter and rectifier, so that the relay will have its contacts picked up any time that energy of a predetermined frequency or frequencies is present in the electrical system. To check that the apparatus is in proper operating condition, I provide means for recurrently supplying to the system pulses of energy having the predetermined frequency or frequencies, which cause the recurrent operation of the code-following relay. The operation of the contacts of this relay is detected by suitable code-detecting means, well known in the railway signaling art. In order to check the continuity of the connection of the apparatus to the electrical system which is to be protected, I provide an auxiliary relay which is connected in the circuit in such manner that should the connection of the detection apparatus become open, the supply of energy to the code-detecting relay will be cut off and its contacts will be released. The contacts of the code-detecting relay may be employed to govern suitable indication means to indicate the presence or absence of energy of predetermined frequency in the system, or may be employed to cause operation of suitable interrupting switches to cut off the supply of energy to the system.

Referring to the single accompanying drawing, there is shown a diagrammatic view of a preferred form of my invention as employed for use in connection with a rectifier which supplies direct current energy to a load, the alternating current energy for the rectifier being supplied by suitable generating means, having a particular fundamental frequency.

As shown in the drawing, the load L, here indicated as a simple resistance load, is supplied with direct current energy from the rectifier R1, which in turn is supplied with alternating current energy from a suitable source such as the alternator G1 shown. The apparatus embodying my invention for checking the presence of energy of a predetermined frequency in the circuit supplying direct current to the load L comprises a voltage divider including the resistors 5, 6, and 7 connected in series across the direct current power buses, a filter F, arranged to pass the frequency or frequencies of the energy which it is desired to detect in these power buses, the rectifier R2 which rectifies the output energy from the filter F and supplies this energy to the winding of a code-following relay BR, and auxiliary relay AR connected across the resistor 7 to check the integrity of the connection to the power buses, a transformer T having a secondary winding connected across the resistors 6 and 7 through a blocking condenser Q1, the primary of transformer T being connected to a source of alternating current energy G2 by a circuit including a recurrently operated contact $a$ of a coding device CT. Additionally, there is provided means for detecting the recurrent operation of the code-following relay BR, which comprises the capacitor Q2 and the code-detecting relay CR which governs the indication lamps G and R. Direct current energy for the operation of the various relays is furnished by a suitable source of low voltage direct current such as the battery LB shown, having its positive and negative terminals designated by the reference characters B and N, respectively.

It will be seen from the drawing that the resistances 5, 6, and 7 are connected in series across the direct current buses, so that a portion of the output voltage of the rectifier R1 appears across each of the resistors. The purpose of the resistor 5 is to prevent the shunting of the transformer T by the relatively low impedance of the load L. The voltage drop across the resistor 6 is supplied to the input of the filter F, and the voltage drop across the resistor 7 is supplied to the winding of the auxiliary relay AR.

It may be assumed, for example, that the generator G1 which supplies alternating current energy to the power rectifier R1 supplies energy at a 60-cycle frequency, and if the rectifier R1 is of the full-wave type, then there will be present in the output of the rectifier energy having a 120-cycle frequency component, if the filter system associated with the rectifier should become inoperative. It will be assumed, therefore, that the apparatus is to detect the presence of energy at 120 cycles in the direct current power buses. Accordingly, the generator G2 is arranged to furnish alternating current energy at 120-cycles to the primary winding of transformer T each time that contact *a* of the coding device CT picks up. The coding device CT may be any one of several well-known arrangements employed in the railway signaling art, and it will suffice to point out that when the operating winding of the coding device CT is connected across the low voltage source of direct current, the contact *a* of the coding device will recurrently open and close at a predetermined rate, say, for example, 180 times per minute. Accordingly, alternating current energy having a 120-cycle frequency is supplied 180 times per minute to the primary winding of transformer T. The pulses of alternating current thereby induced in the secondary winding of transformer T are supplied across the resistors 6 and 7 through the blocking capacitor Q1, which serves to prevent the flow of direct current energy through the secondary winding of the transformer. The filter F may be of the band-pass type, arranged to pass energy having a frequency of 120-cycles per second, and accordingly, each time an impulse of 120-cycle energy is supplied across the resistors 6 and 7, a portion of the energy is supplied through the filter F to the full-wave rectifier R2, and the rectified direct current energy is supplied therefrom to the winding of the code-following relay BR. It follows that with rectifier R1 operating normally, that is, with little or no 120-cycle energy appearing at the rectifier output, the relay BR will have its contact *a* recurrently picked up and released in response to the supply of the pulses of alternating current energy from the transformer T.

The direct current energy supplied across the voltage divider comprising the resistors 5, 6, and 7 causes a voltage drop to exist across the resistance 7, so that direct current energy is supplied therefrom to the winding of the auxiliary relay AR. This relay is of the direct current type, and the construction and arrangement of the parts is such that the relay winding presents a relatively high impedance to alternating current energy, so that only a small amount of the 120-cycle energy supplied from the transformer T flows through the winding of the relay AR. It will be apparent that a failure of any of the connections in the voltage divider, or failure of the connection to the power buses will result in the loss of direct current energy to the winding of the auxiliary relay AR, so that its contact *a* will release. With the connections properly established, the flow of energy through the winding of relay AR causes the contact *a* of this relay to be picked up at this time. With contact *a* of relay AR picked up, and contact *a* of the code-following relay BR recurrently operating, a circuit is established for supplying energy to the code-detecting relay CR. It will be seen from the drawing that when the contact *a* of relay BR is picked up, energy is supplied from the battery LB over front contact *a* of relay AR, and front contact *a* of relay BR to the capacitor Q2. Each time that contact *a* of the code-following relay BR releases, the energy stored in capacitor Q2 is supplied to the winding of the code-detecting relay CR. This relay is of the type in which the contacts are slow in releasing, and the relay is selected and proportioned so that its contacts will remain picked up during the intervals in which no energy is supplied to the winding of the relay from the capacitor Q2. Accordingly, at this time the code-detecting relay CR will be picked up, and its front contact *a* will establish an obvious circuit for supplying energy to the indication lamp G. The indication lamp G, when lighted, indicates that the rectifier is furnishing direct current energy to the load L, with an absence of 120-cycle ripple voltage.

It will now be assumed that a defect occurs in the rectifier R1 or its associated filter circuit, so that an appreciable 120-cycle voltage is superimposed upon the direct current supplied from the rectifier to the load L. The appearance of the 120-cycle voltage across the voltage divider will result in the continuous supply of 120-cycle voltage to the filter F, so that the code-following relay BR will be continuously energized, and its front contact *a* will be continuously picked up, during the time that the 120-cycle voltage exists on the power buses. With contact *a* of relay BR continuously picked up, no energy is supplied to the winding of the code-detecting relay CR, and after a short interval its contact *a* will release, thereby interrupting the supply of energy to the indication lamp G and establishing a circuit for supplying energy to the indication lamp R. Accordingly, a warning is thus provided that the rectifier circuit is not operating properly, and suitable steps can be taken to correct this condition or to guard against any conditions which may arise as a result of the supply of 120-cycle energy to the load L. It will be obvious to those skilled in the art that the indication means may also comprise audible means such as an alarm bell, or the circuit may be further arranged so that the release of the code-detecting relay will operate suitable circuit interrupting equipment to remove the rectifier R1 from the power buses.

From the foregoing, it will be seen that my invention provides a reliable and economical means of detecting the presence of energy of predetermined frequency in electrical systems.

The apparatus as shown in the drawing and arranged in accordance with my invention has the important advantage of operating on a "fail-safe" principle. For example, should the circuit including the resistors 5, 6, and 7 become open at any point, the supply of direct current energy to the winding of the auxiliary relay AR will be cut off, and its contact *a* will release. With contact *a* of relay AR released, no energy can be supplied to the winding of the code-detecting relay CR, with the result that this relay will release within a short time interval, thereby providing a warning indication. Similarly, should the apparatus for supplying the impulses of 120-cycle frequency to the filter F from transformer T become deranged so that 120-cycle energy is either continuously supplied across the resistors 6 and 7 or continuously interrupted, it will be apparent that the code-following relay BR will either be continuously picked up or continuously released. In either event, the code-detecting relay CR will be released to provide a warning indication.

It will be obvious to those skilled in the art, that the arrangement may be employed for checking the presence of more than one frequency on the power buses by suitable construction of the filter F. For example, if the filter F is made of the low-pass type, the relay BR will be energized by energy of any frequency less than the cut-off frequency of the filter. For example, in the case of a poly-phase rectifier circuit operating from 25-cycle alternating energy, the filter F may be arranged to pass frequencies up to 115-cycles, and the testing frequency supplied by the generator G2 could have a 25-cycle per second frequency. Accordingly, the code-following relay BR is recurrently operated by the impulses of 25-cycle frequency applied across the resistors 6 and 7 from the transformer T, but relay BR will also be energized by the harmonics of 25-cycles which fall below the 115-cycle cut-off frequency in the output of the rectifier, for example, 25 cycles, 50 cycles, 75 cycles, and 100 cycles, if some abnormal conditions causes these harmonics to be present.

Other filter arrangements for detecting various combinations of frequencies, such as, for example, band-pass filters, band-elimination filters, etc., will be apparent to those skilled in the art.

From the foregoing, it will be seen that my invention provides means for detecting energy of a predetermined frequency or frequencies in electrical systems, which means is arranged so that the proper operation of the apparatus is continuously checked, and moreover, the arrangement provides for detection of the failure of any of the components, so that an unsafe condition in the checking equipment is instantly indicated.

Although I have herein described and shown only one form of means for detecting energy of a predetermined frequency in electrical systems, it will be apparent to those skilled in the art that various changes and modification may be made therein within the scope of the appended claims without departing from the spirit and scope of my invention.

Having thus described my invention, what I claim is:

1. Means for detecting energy having predetermined characteristics in an electrical system comprising, in combination, voltage divider means for obtaining a fractional portion of the energy supplied to said system, a filter having input and output terminals and proportioned and arranged to pass energy having said predetermined characteristics, said filter having its input connected across at least a portion of said voltage divider means, a code-following relay having a winding energized from the output of said filter, whereby said code-following relay is energized and its contacts are picked up when energy having said predetermined characteristics is present in said system, supply means for recurrently supplying energy having said predetermined characteristics to said voltage divider, and code-detecting means for detecting the recurrent operation of said code-following relay.

2. Means for detecting energy having predetermined characteristics in an electrical system comprising, in combination, voltage divider means for obtaining a fractional portion of the energy supplied to said system, a filter having input and output terminals and proportioned and arranged to pass energy having said predetermined characteristics, said filter having its input connected across at least a portion of said voltage divider means, a code-following relay having a winding energized from the output of said filter, whereby said code-following relay is energized and its contacts are picked up when energy having said predetermined characteristics is present in said system, supply means for recurrently supplying energy having said predetermined characteristics to said voltage divider, code-detecting means for detecting the recurrent operation of said code-following relay, and a circuit governed by said code-detecting relay.

3. Means for detecting the presence of energy having predetermined characteristics in an electrical system, comprising, in combination, voltage divider means for obtaining a fractional portion of the normal energy present in said system, a filter having an input and an output circuit and proportioned and arranged so that energy having said predetermined characteristics will pass through said filter, said filter input circuit being connected across at least a portion of said voltage divider means, a code-following relay having a winding connected to the output circuit of said filter, whereby the contacts of the code-following relay are picked up or released according as energy having said predetermined characteristics is or is not present in the electrical system, supply means for recurrently supplying energy having said predetermined characteristics to said voltage divider, code-detecting means for detecting the recurrent operation of the contacts of said code-following relay, an auxiliary relay having a winding connected across a portion of said voltage divider, said auxiliary relay having contacts which are picked up or released according as the electrical system is or is not energized and the connections of said voltage divider are intact, and circuit means governed jointly by said auxiliary relay and said code-detecting means.

4. Means for detecting the presence of energy having predetermined characteristics in an electrical system, comprising, in combination, voltage divider means for obtaining a fractional portion of the normal energy present in said system, a filter having an input and an output circuit and proportioned and arranged so that energy having said predetermined characteristics will pass through said filter, said filter input circuit being connected across at least a portion of said voltage divider means, a code-following relay having a winding connected to the output circuit of said filter, whereby the contacts of the code-following relay are picked up or released according as energy having said predetermined characteristics is or is not present in the electrical system, supply means for recurrently supplying energy having said predetermined characteristics to said voltage divider, code-detecting means for detecting the recurrent operation of the contacts of said code-following relay, an auxiliary relay having a winding connected across a portion of said voltage divider, said auxiliary relay having contacts which are picked up or released according as the electrical system is or is not energized by the normal energy in said system and the connections of said voltage divider are intact, and circuit means governed jointly by said auxiliary relay and said code-detecting means.

5. In a direct current power system in which alternating current energy is rectified to direct current energy and supplied by power buses to a load, means for detecting the presence of ripple frequency energy in said system comprising, in combinatiion, a first, a second, and a third resistor connected in series across said power buses, a filter having an input circuit and an output circuit and arranged to pass energy having a frequency equal to said ripple frequency, said input circuit being connected across said second resistor, a code-following relay having a winding connected to said output circuit and having contacts which are picked up or released according as energy at said ripple frequency is or is not supplied to the input circuit of said filter, code-detecting means for detecting the recurrent operation of said code-following relay, an auxiliary relay having a winding connected across said third resistor and having contacts which are picked up or released according as direct current is or is not flowing through said third resistor, circuit means governed jointly by said auxiliary relay and said code-detecting means, a blocking capacitor, a source of energy having a frequency equal to said ripple frequency, and circuit means including said blocking capacitor for recurrently connecting said source of energy across said second and said third resistors.

References Cited in the file of this patent

UNITED STATES PATENTS

| Number | Name | Date |
|---|---|---|
| 2,198,901 | Boswau | Apr. 30, 1940 |
| 2,420,232 | Deal | May 6, 1947 |
| 2,454,687 | Baughman | Nov. 23, 1948 |
| 2,455,351 | Beam et al. | Dec. 7, 1948 |
| 2,460,337 | Young | Feb. 1, 1949 |
| 2,461,452 | Thompson | Feb. 8, 1949 |